United States Patent
Kroll et al.

(10) Patent No.: US 11,079,219 B2
(45) Date of Patent: Aug. 3, 2021

(54) METHOD AND DEVICE FOR PRODUCING A 3D THERMOGRAM

(71) Applicant: Universität Kassel, Kassel (DE)

(72) Inventors: Andreas Kroll, Kassel (DE); Antonio Ordonez Müller, Munich (DE)

(73) Assignee: UNIVERSITÄT KASSEL, Kassel (DE)

( * ) Notice: Subject to any disclaimer, the term of this patent is extended or adjusted under 35 U.S.C. 154(b) by 47 days.

(21) Appl. No.: 16/478,518

(22) PCT Filed: Nov. 30, 2017

(86) PCT No.: PCT/DE2017/101033
§ 371 (c)(1),
(2) Date: Jul. 17, 2019

(87) PCT Pub. No.: WO2018/133890
PCT Pub. Date: Jul. 26, 2018

(65) Prior Publication Data
US 2019/0390954 A1 Dec. 26, 2019

(30) Foreign Application Priority Data

Jan. 18, 2017 (DE) .................... 10 2017 100 885.3

(51) Int. Cl.
*G01B 11/24* (2006.01)
*G01J 5/00* (2006.01)

(52) U.S. Cl.
CPC ....... *G01B 11/24* (2013.01); *G01J 2005/0077* (2013.01); *G01J 2005/0081* (2013.01)

(58) Field of Classification Search
CPC .............. G01B 11/24; G01J 2005/0077; G01J 2005/0081; G01J 5/025; G01J 5/089;
(Continued)

(56) References Cited

U.S. PATENT DOCUMENTS 7,611,278 B2 * 11/2009 Hollander ............. G01J 5/0893
374/142
8,254,647 B1 * 8/2012 Nechyba ................ G06K 9/036
382/118
(Continued)

FOREIGN PATENT DOCUMENTS

JP 2014025721 A 2/2014
WO 2014127431 A1 8/2014

OTHER PUBLICATIONS

"A 3D Scan Model and Thermal Image Data Fusion Algorithms for 3D Thermography in Medicine"; Chromy et al.; J. of Healthcare Engineering; 9pages (Year: 2017).*
(Continued)

*Primary Examiner* — Mohamed K Amara
(74) *Attorney, Agent, or Firm* — Dinsmore & Shohl LLP

(57) ABSTRACT

A method of generating a 3D thermogram of an object includes capturing geometrical data of the object to prepare a 3D model of the object, capturing measured temperature values and recording conditions for object points of at least one partial surface of the object, associating the measured temperature values with the object points to generate a 3D thermogram, repeating capturing of measured temperature values for the object points on new recording conditions and comparing the recording conditions with the new recording conditions for the object points. The method further includes automatically overwriting the captured measured temperature value with the repeated captured measured temperature values for the respective object point of the 3D thermogram when the new recording conditions are closer to ideal conditions than the recording conditions, and projecting the generated 3D thermogram onto the associated at least one partial surface of the object itself.

10 Claims, 1 Drawing Sheet

(58) Field of Classification Search
CPC ........ G01J 5/0896; G01J 1/4204; G01J 5/047; G01C 11/00; G01W 1/00
See application file for complete search history.

(56) References Cited

U.S. PATENT DOCUMENTS

| | | | |
|---|---|---|---|
| 9,091,602 B2* | 7/2015 | Cao | G01J 5/522 |
| 9,690,984 B2* | 6/2017 | Butler | G06K 9/00355 |
| 9,823,089 B1* | 11/2017 | Wilcox | B64D 47/08 |
| 9,846,082 B2* | 12/2017 | Xu | G01J 5/0896 |
| 9,973,692 B2* | 5/2018 | Szabo | H04N 5/2257 |
| 9,986,176 B2* | 5/2018 | Moghadam | G06T 7/90 |
| 10,514,459 B2* | 12/2019 | Cunningham | G01S 17/08 |
| 2006/0198421 A1* | 9/2006 | Schreher | G01J 5/08 374/121 |
| 2006/0221072 A1* | 10/2006 | Se | G06T 7/593 345/420 |
| 2006/0285574 A1* | 12/2006 | Chang | G01K 1/14 374/141 |
| 2008/0265162 A1* | 10/2008 | Hamrelius | G01J 5/10 250/330 |
| 2009/0081721 A1* | 3/2009 | Meyer | G01N 33/5005 435/34 |
| 2010/0135550 A1* | 6/2010 | Amon | A61B 5/015 382/128 |
| 2011/0118608 A1* | 5/2011 | Lindner | G01J 5/0025 600/474 |
| 2013/0202009 A1 | 8/2013 | Murugan et al. | |
| 2016/0006951 A1* | 1/2016 | Moghadam | G06T 11/008 348/164 |
| 2017/0079625 A1* | 3/2017 | Wang | A61B 8/5246 |
| 2017/0188841 A1* | 7/2017 | Ma | G16H 40/63 |
| 2018/0357821 A1* | 12/2018 | Tezel | G03B 21/005 |

OTHER PUBLICATIONS

"Generating High Fidelity 3-D Thermograms With a Handheld Real-Time Thermal Imaging System", Muller et al.; IEEE Sensors J. (17), 774-783 (Year: 2017).*

Iwai D. et al.., Optical superimposition of infrared thermography through video projection, Infrared Physics and Technology. Elsevier Science GB, 53(3): 162-172, May 1, 2010 [retrieved on Nov. 13, 2009].

Müller, A. et al., On the temperature assignment problem and the use of confidence textures in the creation of 3D thermograms, 2015 9th International Conference on Sensing Technolgy (ICST), IEEE, pp. 223-228, Dec. 8, 2015 [retrieved on Mar. 21, 2016].

* cited by examiner

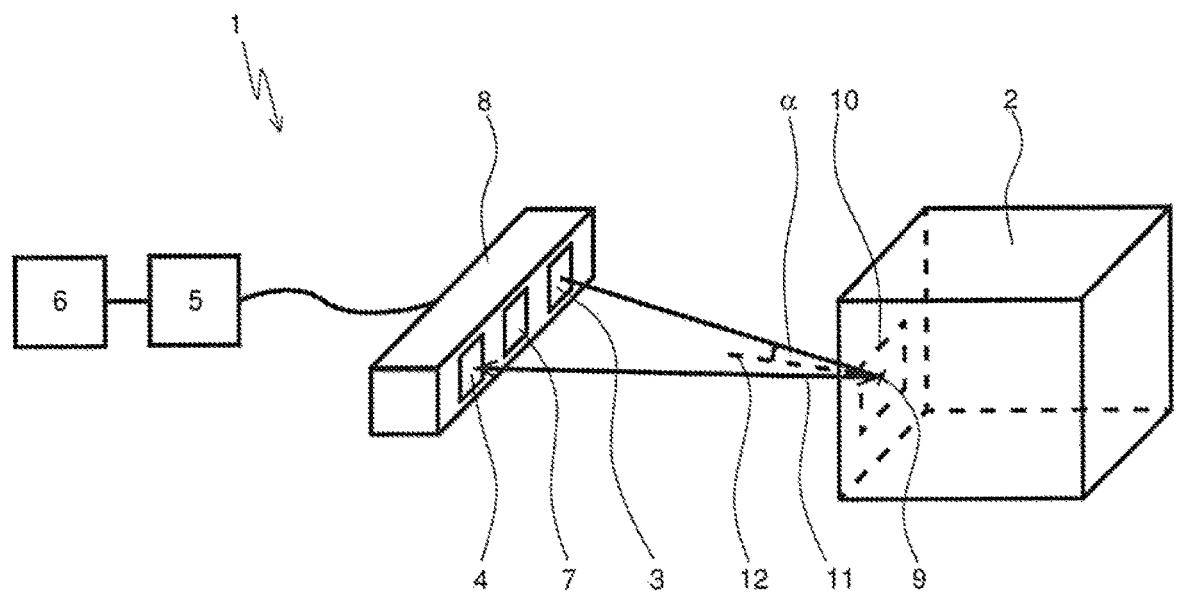

METHOD AND DEVICE FOR PRODUCING A 3D THERMOGRAM

REFERENCE TO RELATED APPLICATIONS

This application is a U.S. national stage application of PCT/DE2017/101031, filed Nov. 30, 2017, which claims priority from German application No. DE 10 2017 100 885.3, filed Jan. 18, 2017, the entire content of both of which is incorporated herein by reference.

FIELD OF THE INVENTION

The disclosure relates to a method of generating a three-dimensional thermogram (abbreviated to 3D thermogram) of an object. The disclosure further relates to an apparatus with which a 3D thermogram can be generated.

BACKGROUND OF THE INVENTION

A system for generating a 3D thermogram of an object is known from the document WO 2014/127431 A1 The system has a hand-held measurement device having a sensor for capturing distance data. The hand-held measurement device further comprises an infrared sensor for capturing thermal data. The object is examined from at least two different positions by the hand-held measurement device, with the distance data and thermal data of the object being recorded for each position. A three-dimensional model of the object is generated by means of a data processing unit of the system using the distance data, with the thermal data recorded by the infrared sensor being associated with object points of the three-dimensional model to thus generate the 3D thermogram that is displayed in real time on a display apparatus of the data processing unit. If a plurality of values for the thermal data are present for an object point, a weighted mean value is associated with the three-dimensional model. The weighting values here depend on the angle of incidence, on the radiation angle, on the distance between the infrared sensor and the object and/or on environmental conditions such as the environmental temperature or similar.

A method is disclosed in the publication "On the Temperature Assignment Problem and the Use of Confidence Textures in the Creation of 3D Thermograms" by Müller et al, ($9^{th}$ International Conference on Sensing Technology (ICST), pp. 223-228, Auckland, New Zealand, December 2015). On the one hand, geometrical data of the object are captured by means of a depth sensor and, on the other hand, measured temperature values for object points of at least one partial surface of the object are captured to generate a 3D thermogram of an object. A three-dimensional model of the object is determined using the geometrical data by means of a data processing unit, with the measured temperature values captured for the different object points being associated with the corresponding object points of the three-dimensional model to thus generate the 3D thermogram. In addition to the geometrical data and to the measured temperature values, data on the recording conditions are captured at which the measured temperature value was captured. Specifically, data on the distance from the object, on the radiation angle with respect to the object surface, and on the angle of incidence with respect to the sensor are captured and are output together with the 3D thermogram to a display connected to the data processing unit. It can thus be recognized when measured temperature values with respect to individual object points were captured under unfavorable recording conditions so that a measurement of this object point should be repeated. When a measurement has taken place under better recording conditions for the same object point in a subsequent recording, the measured temperature value (together with the data on the recording conditions) is automatically overwritten.

It is possible in accordance with the procedures known from the prior art to already provide an overview of the data during the carrying out of the measurement since they are output on a display in real time. Starting from, this, the user can decide whether a repeat measurement is required for specific regions of the object and he can correspondingly realign the measurement device with respect to the object to be examined. A user therefore has to pay attention both to the object to be examined and to the display during the carrying out of the measurement. This can in particular only be done with difficulty when the data processing unit with the display is very remote from the object. A carrying out of the measurement by two persons is then rather necessary, with a first person giving instructions to the second person on how the measurement device should be positioned for a repeat measurement starting from the already recorded and displayed data.

SUMMARY OF THE INVENTION

It is therefore the object of the present invention to provide a particularly user-friendly method and a particularly use-friendly apparatus for generating a 3D thermogram of an object with which method and apparatus a high-quality 3D thermogram can be generated in an efficient manner.

This object is achieved starting from a method in accordance with the characterizing features discussed herein. This object is further achieved starting from an apparatus in accordance with the characterizing features discussed herein.

The disclosure includes the technical teaching that the generated three-dimensional thermogram is projected onto the associated partial surface of the object.

In the method in accordance with the disclosure of generating a 3D thermogram of an object, geometrical data of the object are captured with reference to which a three-dimensional model of the object is prepared and measured temperature values are captured for object points of at least one partial surface of the object. The measured temperature values are associated with associated object points of the three-dimensional model of the object so that a 3D thermogram can be generated for the partial surface, Data on recording conditions at which an associated measured temperature value was detected are additionally captured and/or determined for every object point for which a measured temperature value is captured. These data are used when a measured temperature value and data on the recording conditions are again captured for the repeat measurement for the same object point in a subsequent step. In this case, the data on the recording conditions are compared with one another, with the again captured measured temperature value being automatically associated with the object point in the generated three-dimensional thermogram when the newly captured measured temperature value was captured under better recording conditions. An advantage of this procedure over the weighted averaging proposed in the document WO 2014/127431 is that measured values that were captured under good recording conditions are not averaged with measured values that were captured under poor recording conditions, (The averaging of good and poor measured values does not result in any better measurement result.) Only measurement values that were captured under the best recording conditions are kept. The quality of the generated 3D thermogram can thus be continuously improved. Since in accordance with the disclosure the generated 3D thermogram is projected onto the partial surface of the object that corresponds to the partial surface of the three-dimensional model, the carrying out of the measurement can be facilitated since a user can thus e.g. detect in a simple manner over which partial surfaces and with which respective measurement quality the 3D thermogram already extends and for which partial surfaces measured temperature values should still be captured to generate a complete 3D thermogram of the object that extends over the entire surface of the object. If the current 3D thermogram is displayed on a display, it can admittedly be directly captured when conspicuous measured temperature values have been detected that should be verified and/or corrected by a repeat measurement. The method can, however, be carried out substantially more effectively when the 3D thermogram or information on the recording conditions are projected onto the object. A user who carries out the measurement can optionally draw conclusions, also immediately on the carrying out of the measurement, on the quality of the 3D thermogram already prepared. The user in particular does not have to direct his attention to the object, on the one hand, and to a display, on the other hand, or to rely on instructions of a further person. The recording of the measured values can thus takes place faster overall, in particular on a manual performance of the method, with possible errors in the recording of the measured values simultaneously being minimized.

It may be sufficient for the generated 3D thermogram only to be generated for a partial region of the object. It can correspondingly be sufficient for the three-dimensional model only to reproduce a part of the object and for the measured temperature values and the data on the recording conditions only to be captured for a part of the surface of the object. Geometrical data and measured temperature values and data on the recording conditions are, however, preferably captured for the total surface of the object to thus be able to generate a 3D thermogram of the total object. The data and the measured values can in particular already be captured by one measurement or by a few measurements with small objects or small partial regions of an object to be examined. With larger objects, however, it can be necessary to carry out a plurality of measurements, with each measurement covering a partial surface of the object and with the 3D thermogram ultimately being able to be generated for the total object on the basis of all the measurements.

The geometrical data can, for example, be captured by means of a depth sensor with which the distance from the depth sensor is captured for every object point. The three-dimensional model of the object can be prepared with the geometrical data thus captured. The preparation of the three-dimensional model and the association of the measured temperature values captured for the different object points with associated object points of the three-dimensional model can specifically take place such as described in the publication by Müller et al.

To be able to draw conclusions on the quality of the temperature value thus captured using the data on the recording conditions that are additionally captured for every object point, those data are captured for this purpose that have an influence on the accuracy of the detected measured temperature value. The data on the recording conditions can, for example, comprise data between a distance of the object and an observation point from where the measured temperature values are determined. It can generally be assumed here that measured temperature values that were recorded at a smaller distance are more accurate than measured temperature values that were recorded from a greater distance. Alternatively or additionally, data on a radiation angle at which the measured temperature value was captured can be determined. The radiation angle describes the direction of the infrared beam that is emitted by the object point, that is captured by the sensor, and that can be deduced e.g. with reference to the orientation of the partial surface of the three-dimensional model and to the position of the sensor with respect to this partial surface. Since the angle-dependent heat emission from an object point on the partial surface has its maximum in a direction perpendicular to the partial surface, it is preferred if a measured temperature value is captured at a small radiation angle with respect to the surface normal. The radiation angle should nevertheless be greater than approximately 15° to avoid reflections of the user on the object surface. The method in accordance with the disclosure is preferably configured such that a previously captured measured temperature value is overwritten for an object point of the 3D thermogram when, on a repeat measurement, the radiation angle is smaller than before, but is greater than approximately 15°.

If both the radiation angle and the distance and optionally even further parameters characterizing the recording conditions are determined, a prioritization of the different parameters may be necessary. For example, the radiation angle typically has a greater influence on the quality of the measurement than the distance so that provision can be made that a measured temperature value captured again is only automatically associated with the object point in the 3D thermogram when the deviation from an optimum radiation angle is smaller than in the previously carried out measurement. Provision can, however, also be made that a prioritization takes place in dependence on a relative improvement of the values for the respective parameters. When the radiation angle is only insignificantly closer to the optimum radiation angle on a repeat measurement, but the distance comes substantially closer to an optimum distance, the measured temperature value captured in the repeat measurement can be associated with the object point even if a greater significance is generally attached to the radiation angle.

In accordance with an embodiment of the method in accordance with the disclosure, the data on the recording conditions are projected onto the associated partial surface of the object in addition to the 3D thermogram. A user cart thus not only obtain an overview of the generated 3D thermogram in a simple manner. He rather also simultaneously obtains an overview on the recording conditions under which the individual measured temperature values were captured that form the basis of the 3D thermogram. Starting from this, a decision can then be made whether a measurement should be carried out again under improved recording conditions for individual partial surfaces. The data on the recording conditions can, for example, be projected as a superposition on the 3D thermogram onto the partial surface of the object. It is, however, also possible that the 3D thermogram or the data or the individual data on the recording conditions are selectively projected onto the partial surface. A change can, for example, automatically be made between the projections at predefined time intervals. It is further possible that a change is made in response to a corresponding input of a user between the projection of the 3D thermogram and the data on the recording conditions.

In accordance with an embodiment of the method in accordance with the disclosure, a determination is made whether the data on the recording conditions differ from ideal recording conditions by more than a predefined tolerance value. If this is the case, it is displayed that the capturing of measured temperature values should be repeated for a partial surface of the object. The display can in particular take place by means of a corresponding projection onto the partial surface of the object. It can thus be recognized in a particularly simple manner whether and for which regions a measurement of the measured temperature values should be repeated to improve the quality of the 3D thermogram. For example, the display can take place in the form of a projection of red points onto the corresponding object surface for which repeat measured temperature values should be captured under different recording conditions. The actual color can be selected by the user and/or can depend on the color of the object surface.

In a further embodiment, indications of the recording conditions under which the measured temperature values should again be captured can be displayed and can in particular be projected directly onto the corresponding partial surface for the partial surface for which a measurement should be repeated. The indications can, for example, be displayed in the form of the absolute values for the recording conditions. Deviations from the ideal values can, however, also be displayed. It is further possible that how a sensor should be positioned for a repeat measurement is indicated in the form of directional instructions. It is in this respect particularly simple if the deviations from the ideal values are continuously determined during the repositioning and if the directional instructions are correspondingly adapted. A user can thus be practically guided to the ideal position in the method in accordance with the disclosure.

The captured data and measured values are typically stored in a data processing unit where they are then held for further use, e.g. for the preparation of the three-dimensional model, for the comparison of the data on the recording conditions, and for the association of the measured temperature values with corresponding object points of the three-dimensional model. The processing time required for the individual steps depends, on the one hand, on the performance capability and on the storage capacity of the data processing unit and, on the other hand, on the amount of data to be processed. In particular when a 3D thermogram of a large object should be generated, the time for the production of the 3D thermogram can be very large since in such a case data and measured values on a large number of object points have to be captured and e.g. a large number of measured temperature values also have to be associated with corresponding object points of the three-dimensional model. Provision is therefore made in accordance with an embodiment in accordance with the disclosure that the three-dimensional model is stored in a storage medium separate from the data processing unit and that only that partial surface of the three-dimensional model is uploaded to the data processing unit that corresponds to the partial surface of the object for which the measured temperature values had been captured for the association of the measured temperature values with the associated object points of the three-dimensional model. Only that part of the three-dimensional model is specifically uploaded with which measured temperature values can be associated. It is thus avoided that a large part of the storage capacity of the data processing unit is already occupied solely by the three-dimensional model of the object and thus only a small proportion of the storage capacity remains for the association of the measured temperature values.

The disclosure further relates to an apparatus for generating a 3D thermogram of an object. The apparatus has a first sensor for capturing the measured temperature values for the object points of at least one partial surface of the object. The apparatus further comprises a second sensor by which geometrical data of the object and data on the recording conditions can be captured for the capturing of the measured temperature values by the first sensor. The geometrical data and the data on the recording conditions can here be captured by one and the same sensor. It is, however, also possible that the second sensor has a plurality of sensor elements of which one is configured to detect the geometrical data and another is configured to capture or determine the recording conditions. Finally, the apparatus comprises a data processing unit to which the measured temperature values captured by the first or second sensors, the geometrical data, and the data on the recording conditions are supplied to the data processing unit. A three-dimensional model of the object can, on the one hand, be produced with reference to the supplied geometrical data by means of the data processing unit. On the other hand, the data processing unit is configured to associate the measured temperature values captured for the different object points with the respective associated object point of a corresponding partial surface of the three-dimensional model to generate a 3D thermogram for the partial surface of the object. The data processing unit is additionally configured to compare data on the recording conditions for object points with which a measured temperature value and data on the recording conditions have already been associated and with which a new measured temperature value and associated data on the recording conditions have been determined as part of a subsequent measurement. If the recording conditions for the measured temperature value captured anew are better than for the already present measured temperature value, the newly captured measured temperature value is here automatically associated with the object point in the 3D thermogram in the data processing unit. In accordance with the disclosure, the generated 3D thermogram is projected onto the associated partial surface of the object by means of a projection unit of the apparatus. The information required for this purpose is in this respect in particular directly provided by the data processing unit.

The first sensor by which the measured temperature values are captured can specifically be a thermal imaging camera. The second sensor by which the geometrical data and the data on the recording conditions are captured can be a depth sensor (such as a depth camera or a 3D laser scanner). Alternatively, the second sensor can also be a camera, in particular a color camera. In this case algorithms are used to recognize and track features in images recorded by the camera to acquire geometrical data on the object. It is also possible to use a plurality of sensors simultaneously to thus be able to acquire more accurate geometrical data.

The apparatus can be configured such that a user can move it manually around the object to examine the object from different positions. It is particularly advantageous for this purpose if the apparatus is configured as a hand-held measurement device or if at least the sensors of the apparatus are integrated in a hand-held measurement device. However, the disclosure also comprises those embodiments in which the movement of the apparatus around the object takes place in an automated manner. In accordance with an embodiment of the disclosure, a control unit is provided for this purpose by which the apparatus is automatically movable along a predefined trajectory relative to the object. The trajectory here can specifically be determined by the data processing unit, e.g. while taking account of the data on the recording conditions and of their deviation from predefined ideal conditions. It can, however, also be sufficient if instead of the total apparatus only the sensors of the apparatus are movable relative to the object (or vice versa). The transmission of the data from the movably arranged sensors to the data processing unit arranged as stationary can here take place via cable or wirelessly. To be able to move the sensors along the predefined trajectory in an automated manner, they can, for example, be arranged at a linear path, at a robot arm, or at an aerial robot, with the movement relative to the object being controlled by the control unit.

In accordance with an embodiment in accordance with the disclosure, in addition to the data processing unit a storage medium is provided which is connected to the data processing unit in which the three-dimensional model is stored. Storage capacity for the total three dimensional model thus does not have to be permanently provided in the data processing unit it is rather the ease that only that part of the three-dimensional model for which measured temperature values are currently captured can be uploaded in a specific manner into the data processing unit.

The statements on the method in accordance with the disclosure apply accordingly with respect to further preferred embodiments of the apparatus in accordance with the disclosure.

BRIEF DESCRIPTION OF THE DRAWINGS

Further measures improving the disclosure will be shown in more detail below together with the description of a preferred embodiment of the disclosure with reference to the following FIGURE.

FIG. 1 is a schematic showing a measuring arrangement for carrying out the method in accordance with the disclosure.

DETAILED DESCRIPTION OF THE INVENTION

In the measurement arrangement shown in FIG. 1, an apparatus 1 in accordance with the disclosure is used to generate a 3D thermogram of an object 2 with it. The apparatus 1 has a first sensor 3, a second sensor 4, and a data processing unit 5 that is connected to a storage medium 6. The apparatus 1 furthermore has a projection unit 7. The sensors 3 and 4 and the projection unit 7 are here arranged on a schematically shown carrier 8. The carrier 8 can, for example, be a hand-held measurement device so that a user can move the sensors 3 and 4 relative to the object 2 in a simple manner. Additionally (or alternatively), a camera or color camera, not shown in FIG. 1, can be arranged at the carrier 8 and is likewise connected to the data processing unit 5.

A measured temperature value for an object point 9 of a partial surface 10 of the object 2 can be captured by the first senor 3. A thermal imaging camera can, for example, be used as the first sensor 3 by which a respective measured temperature value can also be captured simultaneously for a plurality of object points 9 of the partial surface 10.

Geometrical data of the object 2 are captured by the second sensor 4. It can specifically be a depth sensor by which the distance 11 of the sensor 4 relative to the object points 9 on the surface of the object 2 can be determined. The thus determined geometrical data are supplied to the data processing unit 5 where a three-dimensional model of the object 2 is generated using the geometrical data. Said three-dimensional model is then transmitted from the data processing unit 5 to the storage medium 6 where the three-dimensional model is stored.

Data on the recording conditions under which the measured temperature value for the object point 9 is captured are additionally acquired by the second sensor 4. The data on the recording conditions here do not necessarily have to be directly captured by the second sensor 4. The data on the recording conditions can rather also be indirectly captured. The disclosure also includes those embodiments in which the data on the recording conditions are determined using data directly captured by the sensor 4. The distance of the sensor 4 from the object point 9 can specifically be captured, with a conclusion hereby also being able to be drawn—with a known position and orientation of the sensors 3 and 4—on the position and orientation of the sensor 3 relative to the object point 9. A radiation angle $\alpha$ at which the measured temperature value for the object point 9 is recorded by the first sensor 3 can additionally be determined with the aid of the second sensor 4. The radiation angle $\alpha$ corresponds to the angle at which the thermal radiation captured by the sensor 3 is radiated off the partial surface 10. The radiation angle $\alpha$ here designates the angle between a connection line from the optical center of the sensor 3 to the object point 9 and a surface normal 12 to the partial surface 10 at the object point 9. In addition, further data on the recording conditions such as the environmental temperature or a radiation background can be captured. They can here be also be captured with different sensors not shown in FIG. 1 that can likewise be arranged at the carrier 8 or also in a stationary manner in the region of the data processing unit 5.

The measured temperature values and data on the recording conditions recorded by the sensors 3 and 4 are supplied to the data processing unit 5 where they are then associated with object points of the three-dimensional model of the object 2 that correspond to the actual object points 9. A 3D thermogram is thus at least generated for the partial surface 10 of the object 2. To generate a complete 3D thermogram for the total object 2, the carrier 8 is moved relative to the object 2 so that the other partial surfaces also successively move into the field of view of the sensors 3 and 4 in following measurements and the corresponding measured temperature values and data can thus also be captured for them.

To be able to associate the respective captured measured temperature values and data, it is here not necessary that the total three-dimensional model is uploaded into the data processing unit 5. It is rather sufficient if a portion of the three-dimensional model is uploaded that includes the respectively examined partial surface 10. Storage capacity of the data processing unit 5 is thus not unnecessarily occupied so that the association of the measured temperature values, and of the data on the recording conditions can practically take place in real time.

If it is found during the association of a measured temperature value and of the data on the recording conditions for an object point 9 that a measured temperature value and data on the associated recording conditions have already been associated with it, the data on the recording conditions of the current measurement and of the previous measurement are compared with one another. If the recording conditions are better in the repeat measurement, i.e. come closer to ideal conditions, the newly captured measured temperature value is automatically associated with the object point of the 3D thermogram. If in contrast the recording conditions with respect to the previous measurement were better, the already present measured temperature value is not overwritten. The quality of the generated 3D thermogram can thus be successively improved.

So that a user of the apparatus 1 can simply capture the partial surfaces 10 for which measured temperature values and associated data on the recording conditions have already been captured, the 3D thermogram generated by the data processing unit 5 is projected onto the associated partial surfaces 10 of the object 2 by the projection unit 7. Since the position and the orientation of the projection unit 7 relative to the sensor 4 are known in advance, the partial surface of the 3D thermogram can be determined that is to be projected onto the partial surface 10 of the object 2. The position and orientation by means of the sensor 4 and thus the orientation and location of the projection unit 7 can in particular be determined relative to the object 2.

Since the 3D thermogram is projected onto the associated partial surfaces 10 of the object 2, the user can also directly determine whether the measured temperature values measured appear to be valid or whether in the individual case a repeat measurement should be made to verify or to correct the already recorded measured values and data. This can be even further simplified when the data on the recording conditions are projected by the projection unit 7 onto the object 2 in addition to the 3D thermogram. The user can thus recognize the conditions at which the measured temperature values were recorded and can selectively carry out a repeat measurement for the object points 9 or for the partial surfaces 10 that were previously only examined under suboptimal recording conditions. This can be particularly intuitively determined when a determination is made by means of the data processing unit 5 whether the recording conditions differ from ideal recording conditions by more than a predefined tolerance value and when a corresponding indication is projected onto the respective object point 9 or onto the respective partial surface 10 of the object 2 on an exceeding of the tolerance value. A red dot can, for example, be projected onto the object 2 that marks the object point 9 for which an exceeding of the tolerance value was found and for which a repeat measurement should therefore be carried out. To carry out the repeat measurement under better and at best even under the ideal recording conditions directional instructions in the form of arrows or similar can additionally be projected onto the object 2 by the projection unit 7 and can guide the user in the direction of the ideal recording conditions. This assistance function can be achieved on the basis of the identified, insufficiently scanned partial surfaces 10 and on the three-dimensional model of the object 2.

In the embodiment shown in FIG. 1, the object 2 is kept simple and it has a simple geometrical shape. In accordance with the disclosure, however, a 3D thermogram can also be generated for objects having a complex geometrical shape such as having undercuts or highly arched surfaces or similar. It can be determined in a particularly simple manner by the projection of the 3D thermogram onto the object surface whether the measured temperature values have already been captured for all the partial surfaces and, optionally, whether their quality is sufficient.

The disclosure is not restricted in its design to the preferred embodiment provided above. A number of variants is rather conceivable that also makes use of the solution shown with generally differently designed embodiments. All the features and/or advantages, including any construction details or spatial arrangements, originating from the claims, the description or the drawings can be essential to the disclosure both per se and in the most varied combinations.

REFERENCE NUMERAL LIST 1 apparatus
2 object
3 sensor
4 sensor
5 data processing unit
6 store medium
7 projection unit
8 carrier
9 object point
10 partial surface
11 distance
12 surface normal
α radiation angle

The invention claimed is:

1. A method of generating a three-dimensional thermogram of an object comprising:
    capturing geometrical data of an object and preparing a three-dimensional model of the object using the captured geometrical data;
    capturing measured temperature values for object points of at least one partial surface of the object, and capturing data on recording conditions for each of the object points of the at least one partial surface of the object;
    associating the measured temperature values for the object points of the at least one partial surface with associated object points of a partial surface of the three-dimensional model of the object and generating a three-dimensional thermogram for the at least one partial surface of the object;
    repeating capturing of measured temperature values for the object points of the at least one partial surface of the object, and repeating capturing of data on new recording conditions for each of the object points of the at least one partial surface of the object;
    comparing the data on recoding conditions for each of the object points of the at least one partial surface of the object for which the measured temperature values have already been captured with the data on the new recording conditions for each respective object point of the at least one partial surface of the object, and automatically overwriting the measured temperature value with the repeated captured measured temperature value for the respective associated object point in the three-dimensional thermogram when the new recording conditions for the repeated captured measured temperature value are closer to predetermined ideal conditions than the recording conditions of the captured measured temperature value or not overwriting the captured measured temperature value for the respective associated object point in the generated three-dimensional thermogram if the recording conditions of the captured measured temperature value are closer to the predetermined ideal conditions than the new recording conditions; and
    projecting the generated three-dimensional thermogram onto the associated at least one partial surface of the object itself.

2. The method of claim 1, wherein the data on recording conditions for each of the object points comprise:
    data of a distance between the object and an observation point from where the measured temperature values are determined; and/or
    data on a radiation angle (a) at which the measured temperature values are determined.

3. The method of claim 1, further comprising projecting the data on the recording conditions onto the associated at least one partial surface of the object.

4. The method of claim 1, further comprising:
determining whether the data on the recording conditions differ from predetermined recording conditions by more than a predefined tolerance value;
making a display on a difference by which the data on the recording conditions is more than the predefined tolerance value; and
making a projection of the display onto the corresponding at least one partial surface of the object when repeating the capturing of measured temperature values for the at least one partial surface of the object.

5. The method of claim 4, further comprising:
displaying the recording conditions under which the measured temperature values be repeatedly captured; and
projecting the display of the recording conditions onto the corresponding at least one partial surface of the object for which the measured temperature values are being repeatedly captured.

6. The method of claim 1, further comprising:
storing the three-dimensional model in a storage medium; and
uploading into a data processing unit only that partial surface of the three-dimensional model of the object that corresponds to the at least one partial surface of the object for which the measured temperature values were captured for associating the measured temperature values with the associated object points of the three-dimensional model of the object.

7. An apparatus for generating a three-dimensional thermogram of an object, comprising:
a first sensor for capturing measured temperature values for object points of at least one partial surface of the object;
a second sensor for capturing geometrical data of the object, and for capturing or determining recording conditions for the capturing of the measured temperature values by the first sensor;
a data processing unit for storing the captured measured temperature values, the captured geometrical data, and the captured or determined recording conditions;
the data processing unit being configured:
to prepare a three-dimensional model of the object using the captured geometrical data;
to associate the captured measured temperature values for the object points of the at least one partial surface with object points of an associated partial surface of the three-dimensional model of the object and generating a three-dimensional thermogram for the at least one partial surface of the object; and
to compare the recording conditions for each of the object points of the at least one partial surface of the object for which the measured temperature value has already been captured with new recording conditions associated with a subsequently captured measured temperature value for each respective object point, and to overwrite the captured measured temperature value for each respective object point in the generated three-dimensional thermogram with the subsequently captured measured temperature value when the new recording conditions for the subsequently captured measured temperature value are closer to predetermined ideal conditions than the recording conditions of the captured measured temperature value or not overwrite the captured measured temperature value for each respective object point in the generated three-dimensional thermogram if the recording conditions of the captured measured temperature value are closer to the predetermined ideal conditions than the new recording conditions; and
a projection unit for projecting the generated three-dimensional thermogram onto the associated partial surface of the object itself.

8. The apparatus of claim 7, wherein the first sensor is a thermal imaging camera and/or the second sensor is a depth sensor.

9. The apparatus of claim 7, further comprising a control unit for automatically moving the first sensor and/or the second sensor, or the apparatus for generating a three-dimensional thermogram relative to the object along a trajectory determined by the data processing unit.

10. The apparatus of claim 7, further comprising a storage medium for the storing the three-dimensional model separately from the data processing unit.

* * * * *